United States Patent
Li et al.

(10) Patent No.: US 7,435,496 B2
(45) Date of Patent: Oct. 14, 2008

(54) ANHYDROUS PROTON CONDUCTOR BASED ON HETEROCYCLE ATTACHED TO A POLYMER BACKBONE

(75) Inventors: Wen Li, Ann Arbor, MI (US); John Muldoon, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/329,802

(22) Filed: Jan. 11, 2006

(65) Prior Publication Data

US 2006/0159974 A1 Jul. 20, 2006

Related U.S. Application Data

(60) Provisional application No. 60/643,341, filed on Jan. 12, 2005.

(51) Int. Cl.
*H01M 8/10* (2006.01)
(52) U.S. Cl. ............... 429/30; 429/33; 429/314; 521/27
(58) Field of Classification Search .......... 429/33, 429/46, 314, 315; 521/27, 32, 36; 528/399
See application file for complete search history.

(56) References Cited

U.S. PATENT DOCUMENTS

| 5,525,436 | A | 6/1996 | Savinell et al. | |
| 6,365,294 | B1 * | 4/2002 | Pintauro et al. | 429/33 |
| 6,723,757 | B1 * | 4/2004 | Kerres et al. | 521/27 |
| 2003/0219640 | A1 * | 11/2003 | Nam et al. | 429/33 |
| 2004/0146769 | A1 * | 7/2004 | Birschbach | 429/34 |

FOREIGN PATENT DOCUMENTS

| WO | WO 00/72395 | | 11/2000 |
| WO | WO 03/077340 | * | 9/2003 |

* cited by examiner

*Primary Examiner*—Raymond Alejandro
(74) *Attorney, Agent, or Firm*—Gifford, Krass, Sprinkle, Anderson & Citkowski, P.C.

(57) ABSTRACT

The invention relates to proton-conducting polymers, including tetrazole-containing polymers. Proton-conducting membranes useful for fuel cell applications are formed from mixtures of a polymer with one or more non-aqueous proton sources. In representative examples of the present invention, tetrazole groups are attached to a polymer backbone such as polyphosphazene, the tetrazole groups interacting with the proton source.

8 Claims, 1 Drawing Sheet

ANHYDROUS PROTON CONDUCTOR BASED ON HETEROCYCLE ATTACHED TO A POLYMER BACKBONE

REFERENCE TO RELATED APPLICATIONS

This application claims priority from U.S. Provisional Patent Application Ser. No. 60/643,341, filed Jan. 12, 2005, the entire content of which is incorporated herein by reference.

FIELD OF THE INVENTION

The invention relates to ion-conducting materials such as proton-conducting polymers and membranes, the preparation thereof, and apparatus such as fuel cells including such materials.

BACKGROUND OF THE INVENTION

Proton-conducting polymers are of great interest, in part due to their application in fuel cells. A serious problem with current polymers, including Nafion™, is a restricted temperature range limited to temperatures below around 80° C. Such membranes require water for proton conduction. However, higher temperature operation is valuable for a number of reasons, including 1) improved tolerance of the catalyst to carbon monoxide; 2) simplification of the cooling system; and 3) increasing proton conductivity at higher temperatures. Therefore, fuel cell operation at temperatures above 100° C., without the need for humidification, is highly desirable.

Proton carriers other than water have been used for high-temperature operation, such as phosphoric acid. Various polymer-phosphoric acid blends have been reported, including $PEO-H_3PO_4$, $PVA-H_3PO_4$, and $H_3PO_4$ doped in PEO-PMMA and polyacrylamine hydrogel. However, these materials suffer from various problems, including poor chemical stability due to hydrolysis of ether and amide groups, or low mechanical stability, particularly at high-temperature. Polybenzimidazole [PBI] blended with phosphoric acid is reported in U.S. Pat. No. 5,525,436. However, the acid quantity was quite high, reaching above 5 mols of $H_3PO_4$ per PBI repeat unit, and therefore there was a problem of leaching of free acid molecules from the membrane and consequent reduction of proton conductivity.

Hence, there is a need for improved polymer electrolyte membranes, particularly for operation at high temperatures.

SUMMARY OF THE INVENTION

The invention relates to proton-conducting polymers, such as anhydrous tetrazole-containing polymers, and mixtures with one or more non-aqueous proton sources, such as phosphoric acid. In examples of the present invention, tetrazole is attached to a polymer backbone, and the tetrazole groups are used to absorb the proton source. The proton source may include one or more of the following acids: sulfuric acid, phosphoric acid, heteropolyacids, phosphates such as zirconium phosphate sulfophenylenphosphonate $(Zr(HPO_4)_{2-x}(SPP)_y)$, sulfates, other inorganic acids and salts thereof, and the like.

In one example, the polymer backbone is a polyphosphazene polymer, having alternating nitrogen and phosphorus atoms along the backbone. A heterocycle such as tetrazole can be attached to a phosphorus atom in the polyphosphazene backbone, either through a linking group or directly bound through a chemical bond. For example, there may be a direct bond between the nitrogen atom of a tetrazole backbone and a phosphorus atom of the polyphosphazene backbone.

Tetrazole-containing substituents can be attached to poly (dichlorophosphazene) substitution of the chlorine atoms by a nucleophilic group. The nucleophilic group may be, for example, an alkali salt of phenol, an aliphatic alcohol, an aliphatic amine, or an aromatic amine. The reaction allows substituent groups to be attached to the polymer backbone. The nucleophilic group may be part of a compound also including a tetrazole group, so that the nucleophilic substitution links the tetrazole group to the polymer backbone. The nucleophilic group can also be a nitrile group, which is then readily converted to tetrazole by cyclization. In some examples of the present invention, the tetrazole group is directly bonded to the polyphosphazene backbone, and is hence largely immobilized relative to the backbone.

The present invention also includes tetrazole-containing substituents attached to other polymer backbones, proton-conducting membranes formed from polymers according to the present invention, and apparatus such as fuel cells including such membranes. Polymers according to the present invention can be formed into a membrane, such as a proton-conducting membrane for use in a fuel cell. The membrane may further include free acid molecules, such as phosphoric acid. The membrane may be anhydrous, allowing operating temperatures over 100° C.

For example, a membrane according to the present invention has appreciable proton conductivity, and comprises a polymer having a polyphosphazene backbone, and side-groups attached to the backbone, the side-group including a heterocycle, preferably an aromatic nitrogen-containing heterocycle such as tetrazole. The heterocycle may be directly bonded to a phosphorus atom of the backbone, or attached through a linking group (such as alkyl, alkenyl, aryl, or other group).

The membrane may be used as a component of an improved membrane electrode assembly (MEA), in which the membrane is sandwiched between first and second electrodes, and used in a fuel cell. The membrane further includes an inorganic proton source, such as sulfuric acid, phosphoric acid, metal sulfate, or metal phosphate. A specific example of a proton source is a zirconium phosphate sulfophenylenphosphonate complex.

The invention also includes polymers in which tetrazole groups are attached to other polymer backbones (such as polyphosphazene, polyether ketone, polystyrene, polyphenylene, poly(trifluorostyrene) polysulfone, polyimide, polyazole, silicon-containing polymers including inorganic-organic hybrid polymers, and polyimidazole), and proton-conducting membranes formed therefrom. Membranes may further include a proton source, such as phosphoric acid, sulfuric acid, metal sulfates, and metal phosphates. The proton source interacts with electron lone pairs associated with heteroatoms of the attached heterocycle. Tetrazole has four heteroatoms, increasing the possible interactions with the proton source compared with other heterocycles such as imidazole. The tetrazole group has a pKa value of −3, which is lower than other heterocycles such as 1,2,4-triazole (pKa=2.19) or imidazole (pKa=7.00). Hence, the tetrazole group is more acidic than 1,2,4-triazole or imidazole.

The interaction between the proton source and the tetrazole group allows a proton-conducting membrane to include larger amounts of the proton source, increasing proton conductivity, and also reduces leaching of the proton source from the membrane, increasing membrane stability. For example, the number (moles) of tetrazole groups in a given membrane may be greater than that of the proton source (such as phosphoric acid), so that the acid molecules are effectively bound to the polymer through interactions with the tetrazole group.

DETAILED DESCRIPTION OF THE INVENTION

Figure 1:
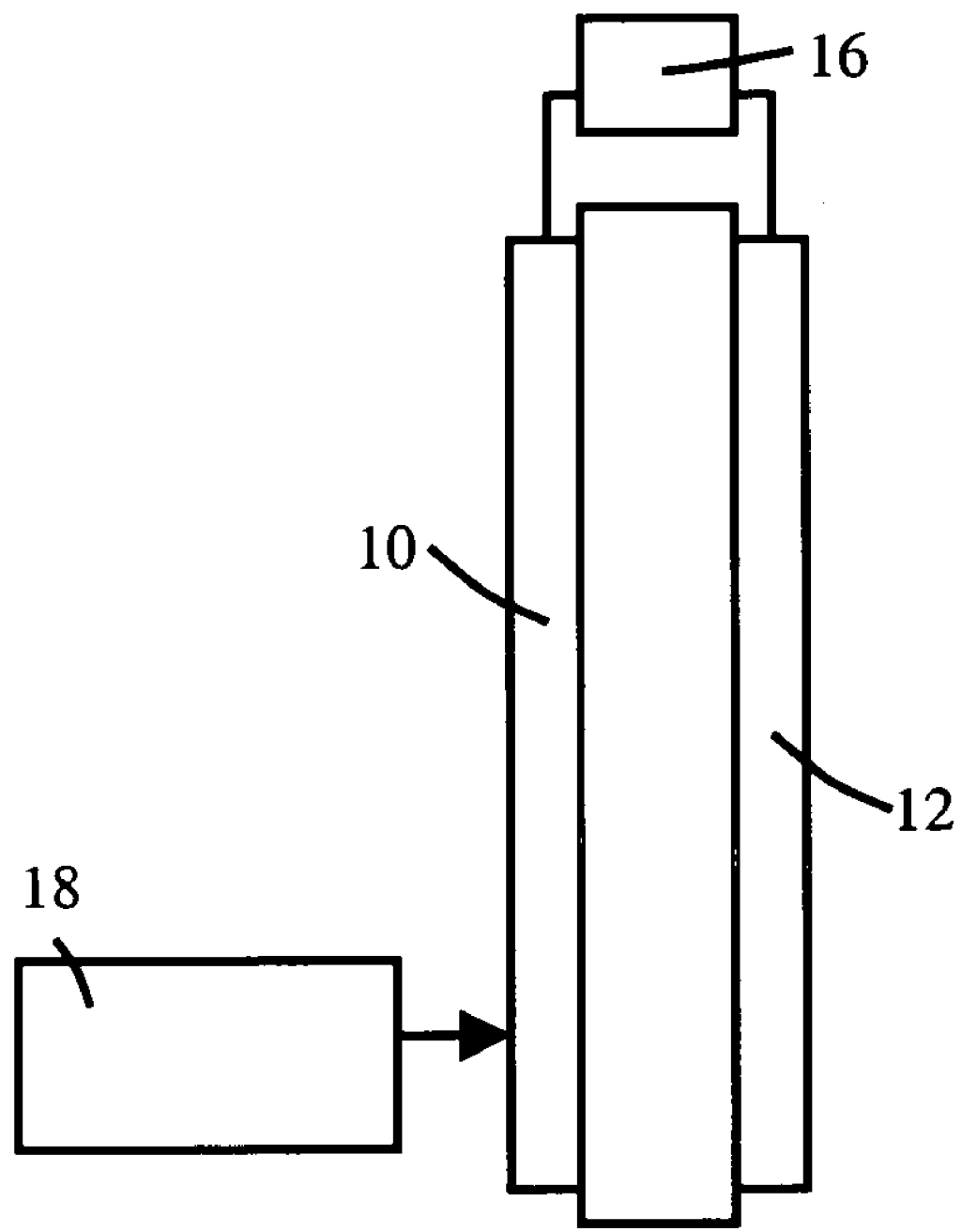
FIG. 1 is simplified schematic of a fuel cell.

Embodiments of the present invention include anhydrous proton conducting polymers in which a tetrazole group is attached to a polymer backbone. Example polymer backbones include polyphosphazene and silicon containing organic-inorganic hybrid polymers. The polymers are blended with a proton source, such as an acid. The acid may be a heteropolyacid or phosphoric acid, for example, allowing high-temperature fuel cell operation under anhydrous conditions. Here, the term "high-temperature" refers to temperatures above 100° C.

The polyphosphazene backbone is a preferred choice for the polymer backbone of a proton-conducting membrane, as this flexible inorganic backbone is chemically stable, stable against oxidation, resists homolytic cleavage, and is inherently flexible. However, other polymer backbones may also be used.

In international patent application WO 00/72395, Pintauro reported a sulfonated polyphosphazene used as a PEM. However, the membrane showed poor proton conductivity under anhydrous conditions.

The polyphosphazene backbone has alternating nitrogen and phosphorus atoms, and each phosphorous atom is attached to two side groups. A representative structure is shown in Scheme 1 below.

Scheme 1

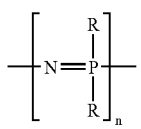

The term polyphosphazene backbone refers to a polymer backbone having alternating N and P atoms as shown above, which may have various substituents. As is known in the polymer arts, polyphosphazene can be synthesized by thermal ring opening polymerization of hexachlorocyclotriphosphazene, giving poly(dichlorophosphazene), which is shown in Scheme 2 below:

Scheme 2

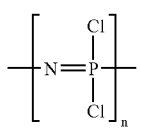

Various polyphosphazenes may then be prepared by substitution of the chlorine atoms. For example, substituents can be introduced by reaction of poly(dichlorophosphazene) with compounds such as RO—Na (for example, giving alkyloxy or aryloxy substituents RO—), $NH_2R$, $NHR_2$, and R-M.

In embodiments of the present invention, one or more substituent groups have the general structure given in Scheme 3 below:

-L-Het-Y  Scheme 3

Here, L is a linking group between a phosphorus atom of the polyphosphazene backbone (or backbone atom of another polymer backbone), Het represents a heterocycle, and Y is a terminal group. The linking group may be include alkyl, alkoxy, or other moiety, and may also be a direct bond between an atom of the heterocycle and an atom of the polymer backbone.

Preferably, Het is an aromatic heterocycle, such as pyridine, pyrrole, pyrylium salt, furan, thiophene, pyrimidine, imidazole, benzimidazole, thiazole, triazole, tetrazole, isoquinolone, indole, and derivatives of such heterocycles, such as fluorinated or acid-group containing derivatives. In a preferred example, the heterocycle is tetrazole.

The linking groups L links the heterocycle to a P atom of the backbone. The heterocycle can be linked in any desired configuration. In some examples of the present invention, the linking group L links a phosphorus atom of the polyphosphazene and the 5-position of a 1H-tetrazole group. However, this example is not limiting. Scheme 4 below indicates a possible location of the linking group L relative to the tetrazole ring and the polymer backbone (only one phosphorus atom P shown):

Scheme 4

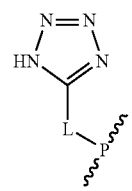

In other examples, the linking group may be omitted, with a bond connecting the heterocycle directly to the polymer backbone.

In another example, the linking group is omitted and a tetrazole group is attached to a phosphorus atom of the polymer backbone by a direct bond to a backbone atom. (P in Scheme 5 below). Relative to Scheme 4, L would be omitted, and a direct bond formed between the heterocycle and the backbone atom. Another example is shown below, for example through interaction of the NH group of tetrazole with the chlorine atom of poly(dichlorophosphazene):

Scheme 5

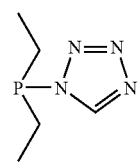

In other examples of the present invention, acid groups may also be attached to the polyphosphazene backbone, as shown in Scheme 6 below. Here, $R_1$ is a first side group (such as H, alkyl, or other group), L is a linking group, "Het" is a heterocycle, such as tetrazole, Y is a terminal group (which may be omitted), and "Acid" is a group containing an acid moiety such as phosphonic acid, sulfonic acid, and the like.

The acid group may be connected by a second linking group.

Scheme 6

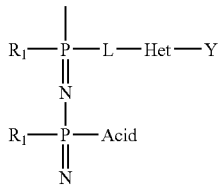

Polymer Preparation

Example processes for preparing the polymers are described below. These examples are provided for illustrative purposes only, and are not to be construed as limiting the scope of the invention.

Tetrazole-containing groups can be attached to a polyphosphazene backbone by substitution of halogens on a halogenated polyphosphazene such as poly(dichlorophosphazene). For example, the chlorine atoms on the backbone of poly (dichlorophosphazene) can be substituted a nucleophilic group. The nucleophilic group may be, for example, an aliphatic alcohol, aliphatic amine, aromatic amine, alkali phenol salt, and derivatives thereof, for example a derivative that includes an aromatic heterocycle such as tetrazole, which is then linked to the backbone using the substitution reaction.

The nucleophilic group may also be a nitrile group which is readily converted to tetrazole by cyclization. A tetrazole group may also be attached to the polymer backbone by substitution of the hydrogen in the NH group. In some examples, the tetrazole group, or other heterocycle, is directly bonded to a polyphosphazene or other polymer backbone, and is hence largely immobilized relative to the polymer backbone.

A number of methods can be used for formation of a polyphosphazene-acid complex. For example, a polymer membrane, such as a tetrazole-containing polyphosphazene polymer membrane, can be immersed in an acid solution. A membrane may also be formed by direct casting from a solution from a polyphosphazene polymer and phosphoric acid in trifluroacetic acid.

Various polymer backbones may be provided with attached tetrazole groups, such as polyphosphazene, polyether ketones, polystyrenes, polyphenylenes, trifluorostyrene polymers, other fluoropolymers, polysulfone, polyimides, polyazole, silicon-containing polymers (including organic-inorganic hybrid polymers), and polyimidazole.

Acid Groups

Additional components may be included in a polymer membrane to improve mechanical properties, ion conductivity, or some other property or properties. Additional components which can be included to improve conductivity can include free acid molecules (such as $H_3PO_4$, sulfuric acid, or a carboxylic acid), proton-conductive inorganic compounds, other solid acids, perfluorosulfonic polymers such as Nafion®, and/or conducting particles (such as metal nanoparticles). A membrane may also include insoluble metal salts such as phosphates (such as $CsH_2PO_4$), other alkali phosphates, other metal phosphates (such as $Zr(HPO_4)_2$), sulfates (such as $CsHSO_4$), other alkali metal salts, other inorganic salts, other acid salts, and the like.

Membrane ion conductivity can also be improved by including one or more species of free acid molecules, and also through acid groups bound to a polymer backbone. Example acids include phosphoric acid $H_3PO_4$, sulfuric acid, a solid inorganic acid such as tungstophosphoric acid or molybdophosphoric acid, an organic acid such as a carboxylic acid, organic molecules substituted with one or more acid groups (such as phenylphosphoric acid and its derivatives, alkylphosphoric acid, and the like), halogenated acid molecules, superacids, and the like. The membranes may also contain added water. The term acid group includes acid salts which may be readily converted to an acid group, and ionized forms of acid groups.

Proton conducting materials can include or be disposed on one or more reinforcing sheets, such as a web material. For example, a thermally stable material, for example in the form of a web or grid, may be included within a membrane or on its surface so as to improve the mechanical properties of the membrane. For example, a Nafion® grid or sheet may be provided to reduce membrane brittleness, to improve proton conductivity, or as a substrate.

Membranes formed according to the present invention can further include particles such as metal-containing particles (such as nanometer-sized hygroscopic metal oxides), polymers dispersed through the membrane for improved mechanical properties as discussed above, main-chain polymers having atoms providing electron lone pairs within the main chain, other acid group containing polymers, dopants such as proton-conductive inorganic compounds, other non-polymer compounds including one or more acid groups (such as $-SO_3H$, $-PO_3H_2$), and/or other compounds having halogenated acid-containing groups (such as $-SO_2NHSO_2CF_3$, $-CF_2SO_3H$, $-CF_2SO_2NHSO_2CF_3$, and the like). Other proton sources and proton solvents can also be included as additional components.

Membrane Preparation

A number of methods can be used to prepare a polymer membrane according to the present invention. In a first approach, a polymer membrane is prepared, then immersed in an acid solution of given concentration for a given length of time to give a proton-conducting membrane containing acid molecules, the acid molecules assisting proton conduction. -For example, the acid solution may be a phosphoric acid solution.

In another example, a membrane may be prepared by direct casting from a solution of the polymer and phosphoric acid in trifluoroacetic acid. The membrane thickness may be controlled by the viscosity of the solution.

Alternatively, a proton source may be introduced by doping the polymer with heteropolyacids or inorganic acids. For example, an improved membrane may be a composite of a polymer according to an embodiment of the present invention and particles (or other form) of a solid inorganic acid. For example, the weight percentage of inorganic acid in the membrane may be in the range 1-50%.

Example proton sources include zirconium phosphate and related compounds, such as zirconium phosphate—SPP complexes, where SPP represents sulfophenylenphosphonate, i.e. $[Zr(O_3P-OH)_2]_x[O_3PC_6H_4SO_3H]_y \cdot nH_2O$. Various ratios of SPP to phosphate $HPO_4$ may be used in order to obtain materials with high proton conductivity.

Applications

Applications of ion exchange membranes, such as proton-electrolyte membranes, according to the present invention include improved membrane electrode assemblies for use in fuel cells, such as hydrogen fuel cells, direct methanol fuel cells, and other fuel cells. Other applications of polymers according to the present invention include electrochromic cells, capacitors, hydrogen separation and purification, reforming or partial oxidation of hydrocarbon fuels, contaminant removal, gas sensing, electrolysis, dialysis, electrodialysis, other electrochemical processes, and other applications related to energy storage and conversion.

The thickness of a proton-exchange membrane varies with the desired application. For fuel cell and other applications, the thickness can be between 0.05 and 0.5 mm, for example approximately 0.2 mm, though other thicknesses are possible. An ion-exchange membrane is one having appreciable ion conductivity.

FIG. 1 is a highly simplified schematic of a conventional polymer electrolyte fuel cell, comprising first electrode 10, second electrode 12, proton-exchange membrane 14 disposed between the first and second electrodes, electrical load 16 electrically connected to the first and second electrodes, and a fuel source 18. For example, the fuel cell 18 may provide hydrogen gas to the first electrode, or anode, with atmospheric oxygen acting as fuel at the second electrode, or cathode. Water and electrons (which pass through the load) are produced during operation of the fuel cell. This illustration is not intended to be limiting, as a proton-exchange membrane according to the present invention can be used with any configuration of polymer electrolyte fuel cell. Fuel cells may further include other components, such as catalyst layers, current collectors, fuel and waste handling systems, and the like.

A membrane electrode assembly (MEA) according to the present invention includes a first electrode, a second electrode, and an ion-exchange membrane according to the present invention sandwiched between the first and second electrodes. For example, referring again to FIG. 1, a MEA may comprise the first and second electrodes 10 and 12 sandwiching an ion-exchange membrane, in this case a proton exchange membrane, 14. A membrane electrode assembly according to the present invention may be used in an improved fuel cell or other apparatus.

Examples described above relate to proton-conducting materials, i.e. materials with appreciable proton conductivity. However, examples of the present invention also include other ion-conducting materials, such as alkali-ion-conducting polymers and membranes.

OTHER EXAMPLES

Improved proton-conducting polymers comprise tetrazole groups attached to a polymer backbone. The polymer backbone is preferably a polyphosphazene or a silicon-containing polymer, but other polymer backbones may be used. A tetrazole-containing polymer may be blended with a proton conductor, such as an acid, in a proton-conducting membrane. The use of non-aqueous proton conductors allows high temperature operation.

Tetrazole can be attached to a backbone of a polymer by substitution of a halogen atom on the polymer backbone. In some examples, a direct bond between the tetrazole group and the polymer backbone largely immobilizes the tetrazole group relative to the backbone.

The improved materials described herein allow higher temperature operation, compared with materials including an aqueous proton source. This simplifies the cooling system requirements of, for example, a fuel cell including these materials. The tolerance of the catalyst to carbon monoxide is also increased, and proton conductivity of the membrane is also greater at the higher operating temperatures.

In other approaches, a polymerizable moiety is substituted with a tetrazole group, and the tetrazole-contained polymer is then prepared by polymerization. For example, a monomer containing a tetrazole group is then polymerized. Any appropriate polymerization method can be used, such as radical polymerization, ion polymerization, condensation polymerization, and ring opening polymerization.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference. In particular, U.S. Prov. Pat. App. Ser. No. 60/643,341, filed Jan. 12, 2005, is incorporated herein in its entirety.

Having described our invention, we claim:

1. An anhydrous proton-conducting membrane comprising:
    a polymer having a single polymer backbone;
    a heterocyclic group attached to the single polymer backbone and
    an inorganic proton source attached to the single polymer backbone.

2. The anhydrous proton-conducting membrane of claim 1, wherein the heterocyclic group is a tetrazole group directly bound to the single polymer backbone by a chemical bond.

3. The anhydrous proton-conducting membrane of claim 2, wherein the tetrazole group is linked to the polymer backbone through a linking group.

4. The anhydrous proton-conducting membrane of claim 2, wherein the inorganic proton source is an acid,
    wherein an interaction between the acid and the tetrazole group stabilizes the membrane.

5. The anhydrous proton-conducting of claim 1, wherein:
    the single polymer backbone is selected from a group consisting of polyphosphazene, polyether ketone, polystyrene, polyphenylene, poly(trifluorostyrene) polysulfone, polyimide, polyazole, silicon-containing polymers, and polyimidazole.

6. The anhydrous proton-conducting of claim 1, wherein the proton source is selected from a group consisting of phosphoric acid, sulfuric acid, sulfates, and phosphates.

7. The anhydrous proton-conducting membrane of claim 1, wherein the proton-conducting membrane is a component of a membrane electrode assembly (MEA), the MBA comprising:
    a first electrode,
    a second electrode, and
    the proton-conducting membrane located between the first electrode and the second electrode.

8. The anhydrous proton-conducting membrane of claim 7, wherein the MEA is part of a fuel cell.

* * * * *